3,380,356
ADJUSTABLE AUTOMATIC PHOTOGRAPHIC
CAMERA
Gerd Kiper and Dieter Engelsmann, Unterhaching, Munich, and Joachim V. Albedyll and Rolf Schroeder, Munich, Germany, assignors to Agfa Aktiengesellschaft, Leverkusen, Germany
Filed June 16, 1965, Ser. No. 464,511
Claims priority, application Germany, June 27, 1964, A 46,442
17 Claims. (Cl. 95—10)

ABSTRACT OF THE DISCLOSURE

A camera wherein a manually operated selector is movable between two extreme positions and through several intermediate positions. The camera is set for automatic operation in one intermediate position of the selector but the automatically selected diaphragm opening and/or exposure time can be changed by moving the selector from the one to another intermediate position.

Figure 1:
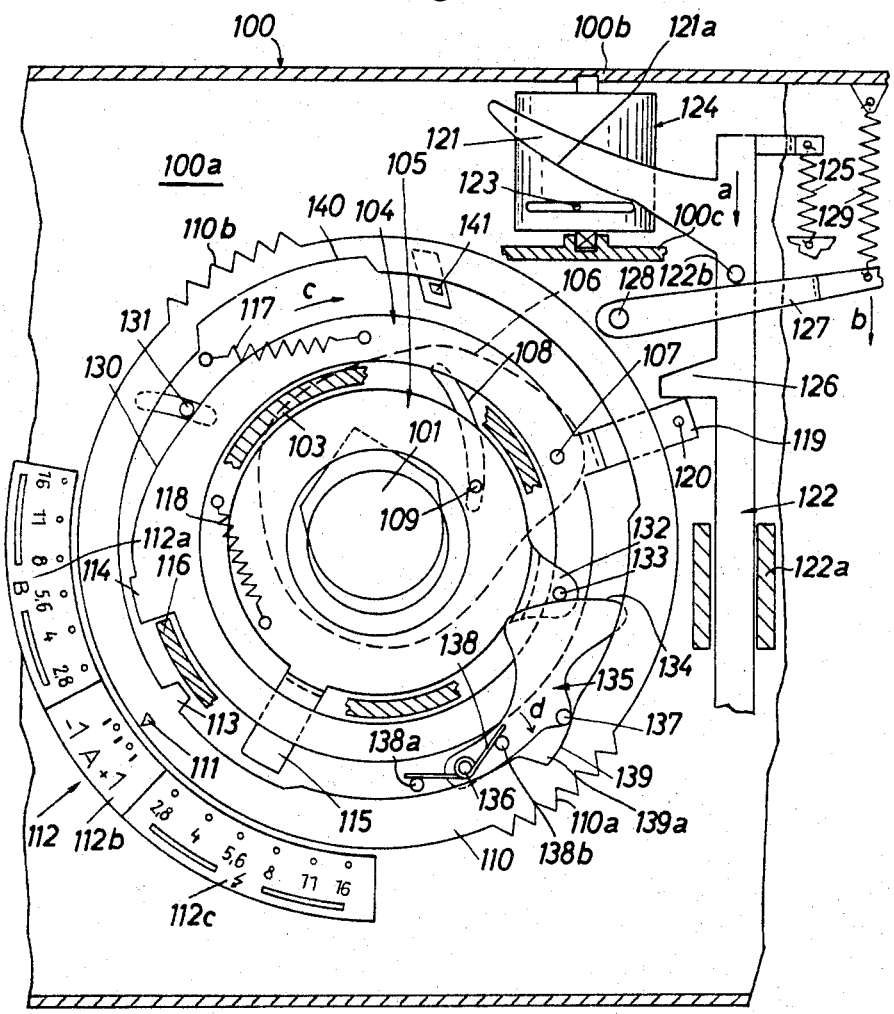

The present invention relates to photographic cameras in general, and more particularly to improvements in photographic cameras of the type disclosed in U.S. Patent No. 3,056,340 to Kiper. Still more particularly, the invention relates to an improved camera mechanism which is provided with a light meter and may be set for manual exposure control, for flash operation or for fully automatic exposure control.

The aforementioned Kiper patent discloses a photographic camera wherein a ring-shaped selector may be moved to and from a single central or intermediate position in which the camera mechanism is set for fully automatic exposure in accordance with the prevailing lighting conditions, i.e., whenever the selector is moved to such central or intermediate position, the mechanism will automatically select the size of the diaphragm opening and the shutter speed. By moving the selector to one side of such central position, the operator can manually select the exposure and, by moving the selector to the other side of its central position, the operator can set the camera for flash operation.

An important object of the present invention is to further improve the just described camera in such a way that, even if the selector has set the camera mechanism for automatic exposure, the operator will be in a position to change or correct the automatically selected exposure, for example, in order to make a proper exposure when the objective faces a light source, to reduce the contrast between the darker and lighter details of the picture, or to take into consideration certain other factors in order to achieve a special effect.

Another object of the invention is to provide an improved photographic camera of the just outlined characteristics wherein corrections of the automatically determined exposure may be carried out by the same selector which is utilized to set the mechanism for automatic, manual or flash operation so that, if desired, no additional movable parts will be needed to thus improve the versatility of the camera.

A further object of the invention is to provide a photographic camera whose mechanism is constructed and assembled in such a way that adjustments in the position of the selector at the time when the camera is set for automatic exposure will change the size of the diaphragm opening and the shutter speed or only one of these values.

An additional object of the invention is to provide a photographic camera wherein the exposure may be selected manually or in a fully automatic way and wherein the automatically selected exposure may be corrected in a sense to admit more or less light and/or to shorten or lengthen the exposure time.

An additional object of the invention is to provide a novel connection between the diaphragm means and the shutter means on the one hand and the manually operable selector on the other hand, and to construct the connection between the selector and these means in such a way that the camera can be properly manipulated not only by skilled photographers but also by amateurs having little skill in taking of pictures.

A concomitant object of the invention is to provide a photographic camera which embodies the above-outlined improved mechanism and wherein such mechanism is exceptionally simple, compact and reliable.

Briefly stated, one feature of our present invention resides in the provision of a photographic camera which comprises a diaphragm mechanism including a pair of rings or analogous setting or control members each of which is turnable about the optical axis to change the size of the diaphragm opening when one thereof is moved with reference to the other or vice versa, a shutter mechanism operatively connected with the diaphragm mechanism to automatically select the exposure time as a function of the angular position of one of the setting members, a selector turnable by hand about the optical axis between and beyond a plurality of intermediate positions, automatic exposure selecting means including a light meter operatively connected with one of the setting members for automatically determining the angular position thereof when the selector assumes one of its intermediate positions, and motion transmitting means provided on at least one of the setting members and on the selector for changing the angular position of the corresponding setting member when the selector is moved between its intermediate positions.

It will be seen that the improved camera comprises a diaphragm mechanism and a shutter mechanism capable of automatically determining the exposure (i.e., the exposure time and the size of the diaphragm opening) in each of several intermediate positions of the selector, and that the selector can correct the automatically determined exposure by changing the size of the diaphragm opening and/or the exposure time in response to movement from one to another intermediate position. In heretofore known photographic cameras wherein the exposure may be determined automatically or manually, automatic determination of the exposure can be made only when the selector assumes a single predetermined position but such automatic setting of the exposure is impossible whenever the selector is moved from its predetermined position. By being capable of correcting or altering the automatically determined exposure, the camera of our present invention may be used to take pictures which are out of the ordinary, for example, which are intentionally overexposed or underexposed. In other words, the user of the improved camera knows in advance that he will underexpose or overexpose or that he will change the automatically determined exposure time and/or the automatically determined size of the diaphragm opening. If he were to allow the camera mechanism to automatically determine the exposure, the user would take a satisfactory picture; however, it happens frequently that a special effect can be produced only if the exposure time and/or the size of the diaphragm opening is adjusted in a manner which is not the same as if the camera were allowed to automatically determine such values. Also, and if the exposure is adjusted manually, i.e., if the operator himself selects the exact size of the diaphragm opening and the exact exposure time, he cannot know (at least in most cases) that the thus selected exposure is indeed different from an exposure which would be selected automatically if the camera were set for automatic operation. Of course, by selecting the exposure manually, an average user has no idea by how much the manually selected exposure differentiates from an exposure which would be selected in response to setting of the camera for automatic operation.

Figure 2:
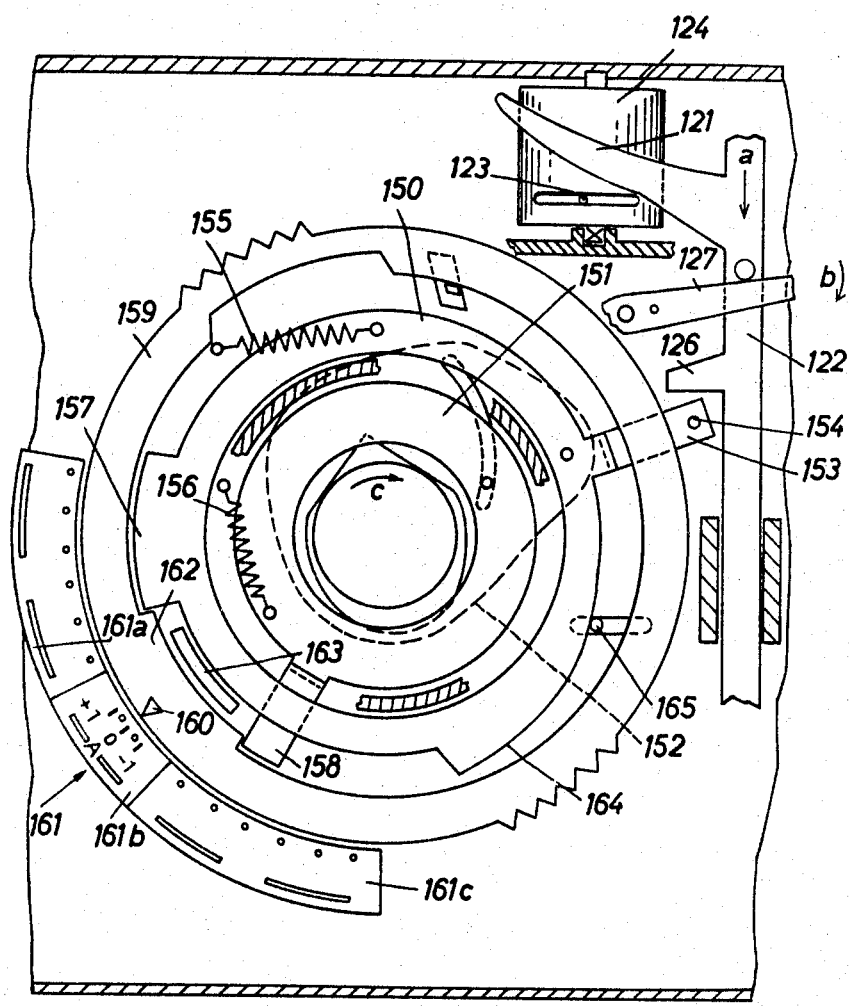

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic front elevational view of a camera mechanism which is constructed and assembled in accordance with a first embodiment of our invention, certain elements of the camera mechanism being shown in section and in part broken away; and FIG. 2 is a similar front elevational view of a modified camera mechanism.

In FIG. 1, the numeral 100 denotes the housing of a still camera having an objective 101 and a diaphragm mechanism including two setting or control members 104, 105 (hereinafter called rings for short). These rings are rotatably supported by a fixed support 103 and each thereof is turnable about the optical axis. The rings 104, 105 are utilized to move a series of diaphragm blades 106 (only one shown) each of which is pivotably secured to the ring 104 by a pin 107 and is provided with an arcuate slot 108 to receive a pin 109 which is carried by the ring 105. Thus, each blade 106 will pivot about the respective pin 107 when the rings 104, 105 are caused to rotate with reference to each other or when one of these rings rotates with reference to the other ring to thereby change the size of the diaphragm opening.

The rings 104, 105 are concentric with a manually turnable ring-shaped selector 110 which is toothed or knurled, as at 110a, 110b, to be readily rotated by fingers when the operator desires to set the camera mechanism for automatic, manual or flash operation. The selector 110 carries an index 111 which may be brought into registry with graduations provided on a fixed scale 112. The scale 112 comprises three sections including a central section 112b having several graduations one of which will register with the index 111 when the camera mechanism is set for automatic operation, a first outer section 112a (provided with an identifying symbol "B") having graduations one of which will register with the index 111 when the operator himself decides to select the size of the diaphragm opening, and a second outer section 112c (provided with a symbol which indicates a flash) having graduations one of which is in registry with the index 111 when the camera mechanism is set for flash operation. The sections 112a, 112c of the scale 112 are mirror images of each other and their graduations are identified by numbers each of which is indicative of a different size of the exposure opening. The central section 112b of the scale 112 carries a symbol "A" which is indicative of automatic setting. The sysmbol "A" is adjacent to the central graduation "0" of the section 112b, and this central graduation "0" will register with the index 111 when the camera mechanism is set for truly automatic operation, i.e., when the exposure time and the size of the diaphragm opening are selected by the camera mechanism without any interference on the part of the user. The other two graduations on the central section 112b are identified by numerals "+1" and "−1," and their purpose is to indicate that the operator has intentionally changed or modified the automatically selected exposure in a sense to either increase or reduce the size of the diaphragm opening and/or to lengthen or shorten the exposure time. In other words, the graduations marked "+1" and "−1" on the central section 112b can indicate that the operator has decided to overexpose or underexpose by intentionally altering the automatically selected exposure.

The selector 110 further comprises a motion transmitting portion 113 which resembles a lug and may be moved into engagement with one of two motion transmitting projections 114, 115 respectively provided on the rings 104 and 105. The projections 114, 115 are located in the path of the motion transmitting lug 113 so that the selector 110 may change the angular position of the ring 104 or 105 when its index 111 is moved beyond the central section 112b, i.e., when the index 111 registers with a graduation on the section 112a or 112c. However, the projections 113, 114 remain in abutment with a stop 116 when the selector 110 assumes one of its intermediate positions in which the index 111 registers with a graduation on the central section 112b. The stop 116 is fixed to the plate-like support 100a of the camera housing 100 and is of arcuate shape and extends between the motion transmitting projections 114, 115. The means for biasing the projections 114, 115 against the adjoining faces of the stop 116 comprises two helical springs 117, 118. The spring 117 is connected with the support 100a and with the ring 104 and tends to rotate this ring in a counterclockwise direction. The spring 118 operates between the support 100a and the ring 105 and tends to rotate this ring in a clockwise direction indicated by the arrow c. It will be seen that the stop 116 determines one end position of each of the rings 104, 105.

The ring 104 comprises a radially outwardly extending portion or arm 119 which forms part of the automatic exposure setting means and carries a pin 120 located in the path of a nose 126 provided on a reciprocable slide member 122 which also forms part of the means for automatically setting the exposure in dependency on the intensity of light coming from a subject. The slide member 122 is guided in a fixed bearing 122a and is biased by a relatively weak spring 125 so that its nose 126 tends to move downwardly, as viewed in FIG. 1, and to entrain the pin 120 on the arm 119 of the ring 104. The slide member 122 further carries an elongated extension or leg 121 having an arcuate camming edge 121a which may engage the pointer 123 of a rotor forming part of an electrical instrument here shown as a galvanometer 124. The angular position of the pointer 123 is a function of the intensity of light coming from the subject so that, when the camming edge 121a engages the pointer 123, the position of the slide member 122 with reference to the support 100a is also a function of the intensity of light. The manner in which the pointer 123 will change its angular position in dependency on a change in lighting conditions is well known in the art and, therefore, the circuit of the galvanometer 124 is not shown in the drawings. It suffices to say here that the galvanometer 124 is electrically connected with a photoelectric cell, or with a photoelectric resistor which is connected in circuit with a source of electrical energy, so that the angular position of the pointer 123 will reflect the prevailing lighting conditions with utmost accuracy. In other words, the galvanometer 124 forms part of a built-in light meter which is utilized when the exposure is to be selected in a fully automatic way, i.e., when the index 111 of the selector 110 registers with a graduation on the central section 112b of the fixed scale 112. The spring 125 tends to move the camming edge 121a of the extension 121 against the pointer 123 but the extension is normally held against such movement by a manually operable release trigger 127 when the latter is held in the idle position shown in FIG. 1 under the bias of a relatively strong return spring 129. The slide member 122 carries a pin-shaped projection 122b which abuts against a median portion of the trigger 127 and normally holds the camming edge 121a away from the pointer 123. The trigger 127 resembles a one-armed lever the left-hand end portion of which is rockable about a fixed shaft 128. The arrow a indicates the direction in which the slide member 122 must move in order to follow the bias of the spring 125, and the arrow *b* indicates the direction in which the trigger 127 is moved by hand in order to expand the spring 129 and to allow for movement of the slide member 122 under the bias of the spring 125. The spring 125 is weaker than the spring 129; therefore, the trigger 127 will automatically return the slide member 122 and its extension 121 to the position shown in FIG. 1 as soon as the spring 129 is allowed to contract. The trigger 127 transmits motion to the slide member 122 through the intermediary of the projection 122*b* and, when fully depressed, the trigger also releases the shutter mechanism.

In the embodiment of FIG. 1, the entire galvanometer 124 is rotatable in bearings 100*b*, 100*c*. Changes in the angular position of the galvanometer 124 are effected in response to insertion of a film supply cartridge to determine the initial position of the galvanometer in dependency on the sensitivity of film. The manner in which the galvanometer 124 may be rotated to take into consideration the sensitivity of the film is disclosed, for example, in Patent No. 3,266,397, granted to Rudolf Kremp et al. and assigned to the same assignee. It is obvious, however, that adjustments necessary to take into consideration the sensitivity of the film may be carried out in another way. Thus, instead of rotating the galvanometer, one can utilize a variable resistor which is connected in circuit with the coil or coils of the galvanometer and which is adjusted in such a way that its resistance is indicative of film sensitivity. Also, it is possible to use a movable masking member which will be caused to overlie a portion of the photoelectric cell or a portion of the photoelectric resistor which forms part of the light meter. At the present time, we prefer to utilize a rotary galvanometer whose initial angular position is selected by a suitable projection or shoulder provided on a film supply cartridge whereon the position of such projection or shoulder with reference to the remainder of the cartridge corresponds to the sensitivity of film which is stored in the freshly inserted cartridge. The means for transmitting motion from the cartridge to the galvanometer 124 may comprise a link train, a gear train or any other suitable motion transmitting connection.

The ring 105 carries a shutter speed or exposure time selecting device in the form of a cam 130 which cooperates with a follower 131 forming part of a conventional retard device for the shutter mechanism of the camera so that the delaying action of the retard device is dependent on the angular position of the ring 104. The follower 131 extends through an elongated arcuate slot provided in the support 100*a*. The shutter mechanism and its retard device are of conventional design and, therefore, they are not fully shown in the drawings.

The ring 105 is further provided with a motion transmitting projection or ear 132 which carries a pin-shaped follower 133 arranged to track a convex cam 134 provided on an adjusting lever 135. The follower 133 is biased against the cam 134 because the spring 118 tends to rotate the ring 105 in a clockwise direction. The adjusting lever 135 is rockable about the axis of a fixed shaft 136 which is parallel to the optical axis and the lever is biased by a torsion spring 138 which operates between stop pins 138*a*, 138*b* and is convoluted around the shaft 136. The spring 138 maintains a follower 137 of the adjusting lever 135 in abutment with a cam 139 provided on the selector 110, i.e., the adjusting lever 135 will be caused to rock in a clockwise direction (arrow *d*) when it is allowed to follow the bias of the spring 138, or in a counterclockwise direction if the selector 110 is caused to move in a clockwise direction, as viewed in FIG. 1. It is obvious that the pin-shaped follower 137 could extend into a suitably configurated cam groove or cam slot of the selector 110, i.e., such cam groove or cam slot could replace the cam 139. The parts 118 and 132–139 together constitute a motion transmitting structure which will cause the ring 105 to change its angular position and to thus change the size of the diaphragm opening when the selector 110 is moved between its intermediate positions in each of which the index 111 points to a portion of the central section 112*b*.

The selector 110 is provided with a cutout 140 bounded by an edge which may guide a lever 141 for manually determining the exposure time. In addition, the camera mechanism shown in FIG. 1 may comprise suitable arresting means which will block movement of the slide member 122 when the mechanism is set for other than automatic operation. The manner in which the lever 141 is controlled by the selector 110 and the construction of the aforementioned arresting means for the slide member 122 are fully disclosed in the U.S. Patent No. 3,056,340 to Kiper.

The camera mechanism of FIG. 1 is operated as follows:

If the user wishes to make an automatic exposure, the release trigger 127 is pivoted in the direction indicated by the arrow *b* whereby the slide member 122 is free to follow the bias of the spring 125 (arrow *a*) until the camming edge 121*a* of the extension 121 reaches the pointer 123. The angular position of the pointer 123 is a function of the intensity of light coming from the subject to be photographed. The trigger 127 moves away from the projection 122*b* when the camming edge 121*a* engages the pointer 123. When the slide member 122 moves downwardly, as viewed in FIG. 1, its nose 126 entrains the pin 120 and causes the arm 119 to turn the ring 104 in a clockwise direction. Thus, the extent of angular displacement of the ring 104 in the direction indicated by the arrow *c* is also a function of the intensity of light which comes from the subject. The ring 105 remains in its illustrated position because the follower 133 abuts against the cam 134 of the adjusting lever 135.

The momentary angular position of the selector 110 is such that its index 111 registers with the graduation "0" on the central section 112*b* of the fixed scale 112 so that the camera mechanism is set for fully automatic operation. However, if the user wishes to correct the automatically selected exposure, he simply turns the selector 110, for example, in a sense to move the index 111 into registry with the graduations "+1" on the central section 112*b*. During such adjustment of the selector 110, the torsion spring 138 is allowed to rock the adjusting lever 135 in a clockwise direction (arrow *d*) and moves the follower 137 deeper into the groove or cutout 139*a* of the cam 139 on the selector 110. The follower 137 is then located in the deepest zone of the groove 139*a*. As the adjusting lever 135 rocks in a clockwise direction, the spring 118 causes the follower 133 to remain in abutment with the cam 134 so that the ring 105 turns in a clockwise (arrow *c*). Thus, by moving, the index 111 into registry with the graduation "+1" on the central section 112*b* of the scale 112, the operator changes the angular position of the ring 105 and effects a certain adjustment in the size of the diaphragm opening because the blades 106 will change their angular positions as soon as at least one of the rings 104, 105 is caused to rotate with reference to the other ring. For example, and if the lighting conditions determined by the light meter of the camera are such that, in response to setting of the camera mechanism for a fully automatic operation (i.e., when the index 111 registers with the graduation "0" on the central section 112*b*), the *f*/stop would equal 4, intentional turning of the selector 110 to move the index 111 into registry with the graduation "+1" would change the *f*/stop to 2.8. In other words, the size of the diaphragm opening is increased.

If the operator wishes to correct the automatically selected exposure by rotating the selector 110 in a clockwise direction, as viewed in FIG. 1, so that the index 111 registers with the graduation "−1" on the central section 112*b* of the fixed scale 112, the size of the diaphragm opening will be reduced, for example, from an *f*/stop "4" (when the index 111 registers with the graduation "0") to an f/stop "5.6." The exposure time remains unchanged because the ring 104 (and hence its cam 130) remains in the automatically selected position. When the camera is set for automatic operation (i.e., when the index 111 of the selector 110 registers with the graduation "+1" or "−1" or "0" on the central section 112b), the angular position of the ring 104 is selected solely by the slide member 122 of the automatic exposure setting means (via nose 126, pin 120 and arm 119), and such angular position remains unchanged if the index 111 is moved from registry with the graduation "0" into registry with the graduation "+1" or "−1," or vice versa, because such angular movement of the selector 110 changes only the angular position of the ring 105 (through the motion transmitting structure 118, 132–139) but not the angular position of the ring 104.

Referring now to FIG. 2, there is illustrated a modified camera wherein any corrections which the operator wishes to carry out in order to alter the automatic selection of the exposure (f/stop and exposure time) are made in a somewhat different way. This camera also comprises a diaphragm mechanism including two setting rings 150 and 151 which can determine the angular position of diaphragm blades 152 (only one shown) in the same way as described in connection with FIG. 1. The ring 150 comprises a radially outwardly extending projection or arm 153 which corresponds to the arm 119 of the ring 104 and carries a pin 154 extending into the path of the nose 126 on the slide member 122. The rings 150, 151 are respectively biased by springs 155, 156. The spring 155 tends to rotate the ring 150 in a counterclockwise direction, as viewed in FIG. 2, and the spring 156 tends to rotate the ring 151 in the opposite (counterclockwise) direction. Motion transmitting projections 157, 158 of the rings 150, 151 are located at the opposite sides of a motion transmitting portion or lug 162 provided on a rotary ring-shaped selector 159. The ring 150 comprises a cam 164 which corresponds to the cam 130 shown in FIG. 1 and cooperates with a follower 165 forming part of a retard device for the shutter mechanism.

The rings 150, 151 are rotatable about the optical axis and are concentric with the manually adjustable selector 159. This selector carries an index 160 which may be moved into registry with graduations on the sections 161a, 161b, 161c of a fixed scale 161. The sections 161a, 161b, 161c respectively correspond to the sections 112a, 112b, 112c of the scale 112. The length of the motion transmitting lug 162 on the selector 159 (as seen in the circumferential direction of the selector) exceeds the length of a fixed stop 163 so that, when the selector 159 assumes the position shown in FIG. 2 in which the index 160 registers with the graduation "0" on the central section 161b of the fixed scale 161, the motion transmitting projections 157, 158 of the rings 150, 151 abut against the opposite end faces of the lug 162. The projections 157, 158 are held in such positions by the springs 155, 156, and the diaphragm mechanism 150–152 is then set to define an opening having a maximum size. The stop 163 may be replaced by two shorter stops as long as the combined length of such stops (as seen in the circumferential direction of the setting rings 150 and 151) equals the length of the stop 163. The difference between the length of the stop 163 and the length of the lug 162 is selected in such a way that the projections 157, 158 remain in abutment with the corresponding end faces of the lug 162 whenever the index 160 registers with a graduation of the central section 161b. When the index 160 registers with a graduation of the section 161a, the projection 158 of the ring 151 abuts against the adjoining end face of the stop 163, and the projection 157 of the ring 150 will abut against the stop 163 when the index 160 is moved into registry with a graduation of the section 161c. Thus, the stop 163 will come into actual contact with the projection 157 or 158 when the camera is respectively set for manual or flash operation.

If the operator decides that the camera should carry out a fully automatic selection of the exposure, he moves the index 160 into registry with the graduation "0" on the central section 161b of the fixed scale 161. The operator then pivots the trigger 127 (arrow b) so that the slide member 122 can move downwardly (arrow a) until the camming edge of the extension 121 reaches the pointer 123 of the galvanometer 124. During such movement, the nose 126 of the slide member 122 rotates the ring 150 in a clockwise direction (via pin 154 and arm 153) whereby the ring 150 changes the initial position of the diaphragm blades 152 and its cam 164 selects the proper exposure time through the intermediary of the follower 165. The arrow c indicates the direction in which the ring 150 rotates in response to longitudinal displacement of the slide member 122 (arrow a). The angular position of the ring 151 remains unchanged because its projection 158 is biased by the spring 156 and abuts against the one end face of the motion transmitting lug 162.

Assuming now that the operator wishes to correct the automatically selected exposure. All he has to do is to rotate the selector 159, for example, in a counterclockwise direction, as viewed in FIG. 2, so that the index 160 moves into registry with the graduation "+1" on the central section 161a of the fixed scale 161. This is done before the trigger 127 is pivoted in the direction indicated by the arrow b. As the index 160 moves into registry with the graduation "+1," the lug 162 entrains the projection 158 and causes the ring 151 to rotate in a counterclockwise direction. At the same time, the spring 155 keeps the projection 157 in abutment with the lug 162 so that the ring 150 also rotates in a counterclockwise direction and through the same angle as the ring 151. Thus, the relative position of the rings 150, 151 remains unchanged. Of course, whenever the ring 150 rotates in a counterclockwise direction (while the trigger 127 is idle), the pin 154 on the arm 153 moves nearer to the nose 126 of the slide member 122.

If the lighting conditions are such that, when the index 160 registers with the graduation "0" on the central section 161b, the pointer 123 of the galvanometer 124 arrests the extension 121 in a position in which the nose 126 has set the diaphragm mechanism for an f/stop of "4" and the shutter mechanism for an exposure time of 1/60 of a second, an angular adjustment of the selector 159 to move the index 161 into registry with the graduation "+1" on the central section 161b will, for example, change the f/stop to "4.8" and the exposure time to 1/90 of a second. This is due to the fact that, when the index 161 registers with the graduation "+1," the pin 154 is moved nearer to the nose 126 of the slide member 122 so that the member 122 will cause a greater angular displacement of the ring 150 and cam 164..

However, when the index 161 is moved into registry with the graduation "−1" of the central section 161b, the pin 154 is moved away from the nose 126 and the f/stop is then changed from "4" to, for example, "3.4," together with a change in the exposure time from 1/60 to, for example, 1/45 of a second. After it has moved away from the pin 154, the trigger 127 will release the shutter mechanism. Thus, the shutter mechanism is released subsequent to selection of the size of the diaphragm opening.

It will be seen that, in the embodiment of FIG. 1, the selector 110 will only change the size of the diaphragm opening whenever the index 111 is moved into registry with the graduation "+1" or "−1" on the central section 121b of the scale 112. On the other hand, by moving the index 161 shown in FIG. 2 into registry with the graduation "+1" or "−1" on the central section 161b of the fixed scale 161, the user can change the size of the diaphragm opening and the exposure time. This will be readily understood since, in the first embodiment, the selector 110 changes only the position of the ring 105 whereas the position of the ring 104 and cam 130 remains unchanged. In the second embodiment of our invention, the selector 159 will change the angular position of the ring 151 and also of the ring 150 (together with the cam 164).

The index 111 or 160 may be provided on the fixed support for the camera mechanism, and the scale 112 or 161 may be provided on the selector 110 or 159.

It is clear that the improved camera mechanism is susceptible of many additional modifications without departing from the spirit of our invention. For example, the diaphragm mechanism 104–106 or 150–152 could be replaced by different types of diaphragm mechanisms. Also, automatic selection of the exposure can begin from the smallest f/stop and from the shortest exposure time which can be selected by the camera.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a diaphragm mechanism and a shutter mechanism, one of said mechanisms comprising two setting members turnable about the optical axis to change the respective exposure value when turning with reference to each other; a selector turnable about the optical axis between and beyond a plurality of intermediate positions; automatic exposure selecting means operatively connected with said mechanisms for selecting the exposure in dependency on lighting conditions when said selector assumes one of said intermediate positions; and motion transmitting means provided on at least one of said setting members and on said selector for changing the angular position of said one setting member when said selector is moved between said intermediate positions to correct the automatically selected exposure.

2. In a camera, a diaphragm mechanism including a pair of setting members turnable about the optical axis to change the size of the diaphragm opening when turning with reference to each other; a shutter mechanism; a selector turnable about the optical axis between and beyond a plurality of intermediate positions; automatic exposure selecting means operatively connected with said mechanisms for selecting the exposure in dependency on lighting conditions when said selector assumes one of said intermediate positions; and motion transmitting means provided on at least one of said setting members and on said selector for changing the angular position of said one setting member when said selector is moved between said intermediate positions to correct the automatically selected exposure.

3. In a camera, a diaphragm mechanism including a pair of setting rings turnable about the optical axis to change the size of the diaphragm opening when turning with reference to each other; a shutter mechanism operatively connected with one of said rings to automatically select the exposure time as a function of the angular position of said one ring; a ring-shaped selector turnable about the optical axis between and beyond a plurality of intermediate positions; automatic exposure selecting means operatively connected with one of said mechanisms for automatically determining the respective value when said selector assumes one of said intermediate positions; and motion transmitting means provided on said selector and on at least one of said rings for changing the angular position of such ring when the selector is moved between said intermediate positions to correct the automatically selected exposure.

4. In a camera, a diaphragm mechanism including a pair of setting members turnable about the optical axis to change the size of the diaphragm opening when turning with reference to each other; a shutter mechanism operatively connected with said diaphragm mechanism to automatically select the exposure time as a function of the angular position of one of said members; a selector turnable by hand about the optical axis between a plurality of intermediate positions and in opposite directions beyond such intermediate positions; automatic exposure selecting means operatively connected with one of said setting members for automatically determining the angular position thereof when said selector assumes one of said intermediate positions; and motion transmitting means provided on at least one of said members and on said selector for changing the angular position of such setting member when said selector is moved between said intermediate positions to correct the automatically selected exposure.

5. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on the other of said rings and on said selector for changing the angular position of said other ring when said selector is moved between said intermediate positions to correct the automatically selected exposure.

6. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on the other of said rings and on said selector for changing the angular position of said other ring when said selector is moved between said intermediate positions to correct the automatically selected exposure, said motion transmitting means comprising cooperating cam and follower means one of which is provided on said other ring and the other of which is provided on said selector.

7. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on the other of said rings and on said selector for changing the angular position of said other ring when said selector is moved between said intermediate positions to correct the automatically selected exposure, said motion transmitting means comprising a first follower provided on said other ring, an adjusting lever pivotable about a fixed axis which is parallel with the optical axis and comprising a first cam tracked by said first follower, resilient means for biasing said first follower against said first cam, a second follower provided on said lever, and a second cam provided on said selector and tracked by said second follower, said lever being arranged to rock about said pivot axis in response to movement of said selector between said intermediate positions to thereby change the angular position of said other ring through the intermediary of said first cam.

8. A structure as set forth in claim 7, wherein said second cam is integral with said selector and further comprising second resilient means for biasing said second follower against said second cam.

9. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on said rings and on said selector for turning both said rings in the same direction and through the same angle when said selector is moved between said intermediate positions to thereby correct the automatically selected exposure.

10. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on said rings and on said selector for turning both said rings in the same direction and through the same angle when said selector is moved between said intermediate positions to thereby correct the automatically selected exposure, said motion transmitting means comprising a motion transmitting portion provided on said selector, a motion transmitting portion provided on each of said rings, and resilient means for biasing the motion transmitting portions of said rings against the motion transmitting portion of said selector, the dimensions of the motion transmitting portion on said selector being such that, when the other two portions abut thereagainst, the size of the diaphragm opening assumes a maximum value.

11. In a camera, a diaphragm mechanism including a pair of rings turnable about the optical axis to change the size of the diaphragm opening when turning with reference each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; and motion transmitting means provided on said rings and on said selector for turning both said rings in the same direction and through the same angle when said selector is moved between said intermediate positions to thereby correct the automatically selected exposure, the size of the diaphragm opening assuming a maximum value when the motion transmitting portions of said rings abut against the motion transmitting portion of said selector.

12. In a camera, a diaphragm mechanism including a pair of rings turnable about the optical axis to change the size of the diaphragm opening when turning with reference to each other; a shutter mechanism operatively connected with one of said rings to automatically select the exposure time as a function of the angular position of said one ring; a ring-shaped selector turnable by hand about the optical axis between and beyond a plurality of intermediate positions; automatic exposure selecting means operatively connected with said one ring for automatically determining the angular position thereof when said selector assumes one of said intermediate positions; motion transmitting means provided on said rings and on said selector for turning both said rings in the same direction and through the same angle when said selector is moved between said intermediate positions to thereby correct the automatically selected exposure, said motion transmitting means comprising a motion transmitting portion rigid with said selector and having two angularly spaced faces, a projection provided on each of said rings, and resilient means for biasing said rings in opposite directions so that each of said projections abuts against one of said faces when the selector assumes one of said intermediate positions, the angular distance between said faces being such that said diaphragm mechanism defines an opening of maximum size when said projections abut against the respective faces; and a fixed stop provided between said projections, said stop being spaced from said projections when the selector assumes one of said intermediate positions but preventing rotation of one of said rings when the selector is moved in one direction beyond said intermeditae positions so that, during such movement of the selector, only the other ring is entrained by the respective face.

13. In a camera, a diaphragm mechanism and a shutter mechanism, one of said mechanisms comprising two setting members turnable about the optical axis to change the respective exposure value when turning with reference to each other; a selector turnable about the optical axis between and beyond three intermediate positions including a central position; automatic exposure selecting means operatively connected with said mechanisms for selecting the exposure in dependency on lighting conditions when said selector assumes said central position; and motion transmitting means provided on at least one of said setting members and on said selector for changing the angular position of said one setting member when said selector is moved from said central position to another intermediate position to correct the automatically selected exposure.

14. In a camera, a diaphragm mechanism and a shutter mechanism, one of said mechanisms comprising two setting members turnable about the optical axis to change the respective exposure value when turning with reference to each other; a selector turnable about the optical axis between and beyond a plurality of intermediate positions; automatic exposure selecting means operatively connected with said mechanisms for selecting the exposure in dependency on lighting conditions when said selector assumes one of said intermediate positions; motion transmitting means provided on at least one of said setting members and on said selector for changing the angular position of said one setting member when said selector is moved between said intermediate positions to correct the automatically selected exposure; and cooperating scale and index means for indicating the position of said selector.

15. A structure as set forth in claim 14, wherein said scale means is fixed and said index means is provided on said selector.

16. In a camera, a diaphragm mechanism and a shutter mechanism, one of said mechanisms comprising two setting members turnable about the optical axis to change the respective exposure value when turning with reference to each other; a selector turnable about the optical axis between and beyond a plurality of intermediate positions; automatic exposure selecting means operatively connected with said mechanisms for selecting the exposure in dependency on lighting conditions when said selector assumes one of said intermediate positions; means for arresting said automatic exposure selecting means when said selector is moved beyond said intermediate positions; and motion transmitting means provided on at least one of said setting members and on said selector for changing the angular position of said one setting member when said selector is moved between said intermediate positions to correct the automatically selected exposure.

17. In a camera, a diaphragm mechanism and a shutter mechanism, one of said mechanisms comprising two setting members turnable about the optical axis to change the respective exposure value when turning with reference to each other; a selector turnable about the optical axis between and beyond a plurality of intermediate positions to manually select the exposure when moved in one direction beyond such intermediate positions and to set the camera for flash operation when moved in the opposite direction beyond such intermediate positions; automatic exposure selecting means operatively connected with said mechanisms for selecting the exposure in dependency on lighting conditions when said selector assumes one of said intermediate positions; and motion transmitting means provided on at least one of said setting members and on said selector for changing the angular position of said one setting member when said selector is moved between said intermediate positions to correct the automatically selected exposure.

References Cited

UNITED STATES PATENTS

| 3,056,340 | 10/1962 | Kiper | 95—10 |
| 3,086,435 | 4/1963 | Hennig et al. | 95—10 |
| 3,148,604 | 9/1964 | Rentschler | 95—10 |

FOREIGN PATENTS 1,277,841 10/1961 France.

NORTON ANSHER, *Primary Examiner.*

J. F. PETERS, *Assistant Examiner.*